(12) United States Patent
Rendall et al.

(10) Patent No.: US 12,429,231 B2
(45) Date of Patent: Sep. 30, 2025

(54) DENSITY CONTROLLED PHASE-CHANGING MATERIAL (PCM) SPHERES FOR INCREASED HEATING POWER AND OPTIMAL DELIVERY TEMPERATURE IN HOT-WATER TANKS

(71) Applicant: UT-Battelle, LLC, Oak Ridge, TN (US)

(72) Inventors: Joseph D. Rendall, Oak Ridge, TN (US); Kashif Nawaz, Knoxville, TN (US); William E. Asher, Chicago, IL (US); Ahmed F. Elatar, Knoxville, TN (US); Jian Sun, Knoxville, TN (US); Jamieson Brechtl, Knoxville, TN (US); Xiaoli Liu, Knoxville, TN (US); Keju An, Knoxville, TN (US); Mingkan Zhang, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 504 days.

(21) Appl. No.: 17/890,791

(22) Filed: Aug. 18, 2022

(65) Prior Publication Data

US 2023/0082570 A1 Mar. 16, 2023

Related U.S. Application Data

(60) Provisional application No. 63/237,239, filed on Aug. 26, 2021.

(51) Int. Cl.
F24D 11/00 (2022.01)
(52) U.S. Cl.
CPC ........ *F24D 11/002* (2013.01); *F24D 2220/10* (2013.01)

(58) Field of Classification Search
CPC .............. F24D 11/002; F24D 2220/10; F24D 11/0214; Y02E 60/14; F28D 20/023; F28D 20/02; F24H 7/0241; F24H 4/04
See application file for complete search history.

(56) References Cited

U.S. PATENT DOCUMENTS

| 10,458,678 | B2 | 10/2019 | Trant et al. |
| 2012/0018116 | A1* | 1/2012 | Mathur ..................... B65B 5/06 |
| | | | 165/10 |
| 2020/0217518 | A1 | 7/2020 | Field et al. |

FOREIGN PATENT DOCUMENTS

KR    2019054304 A  *  5/2019  ........... F28D 1/0206

OTHER PUBLICATIONS

Suresh, et al., "Experimental study on combined sensible-latent heat storage system for different volume fractions of PCM". Solar Energy 212 (2020) 282-296.

(Continued)

*Primary Examiner* — Frantz F Jules
*Assistant Examiner* — Martha Tadesse
(74) *Attorney, Agent, or Firm* — Fox Rothschild LLP

(57) ABSTRACT

A medium for energy storage includes a plurality of capsules. Each capsule contains a phase changing material (PCM) configured to undergo a liquid-solid phase transition at a solidification temperature, $T_S$. The PCM undergoes a relative volume change due to the phase transition. A shell is filled with the PCM. The shell contains a first heat-conducting material, and is configured to comply to the relative volume change. The relative volume change is configured to cause a buoyancy force, which acts on the capsule when the capsule is disposed in water at a water temperature, $T_W$, to be larger than the capsule's weight for $T_W > T_S$, and equal to or smaller than the capsule's weight for $T_W < T_S$. The $T_s$ can be within ±5° F. of a design water (Continued)

temperature $T_o$ at the outlet of a water tank. The capsule can be neutrally buoyant in water at $T_o$.

17 Claims, 17 Drawing Sheets

(56) References Cited

OTHER PUBLICATIONS

Kenisarin et al.: "Melting and Solidificaiton of PCMs inside a Spherical Capsule: A Critical Review." Journal of Energy Storage 27(101082):1-38 2020.

* cited by examiner

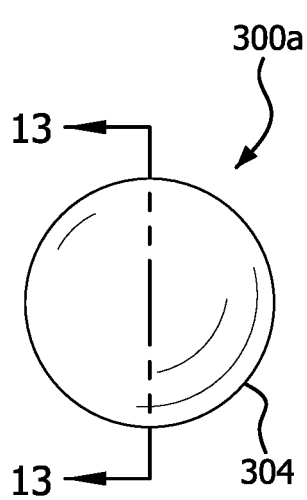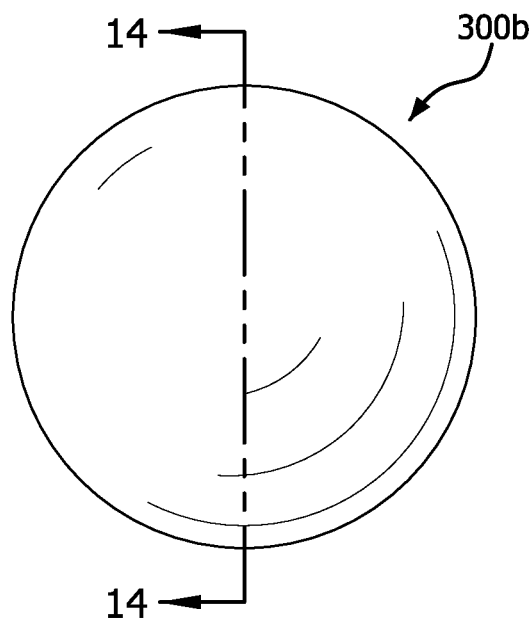
FIG. 11  FIG. 12
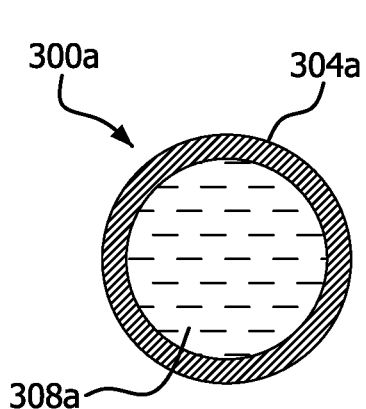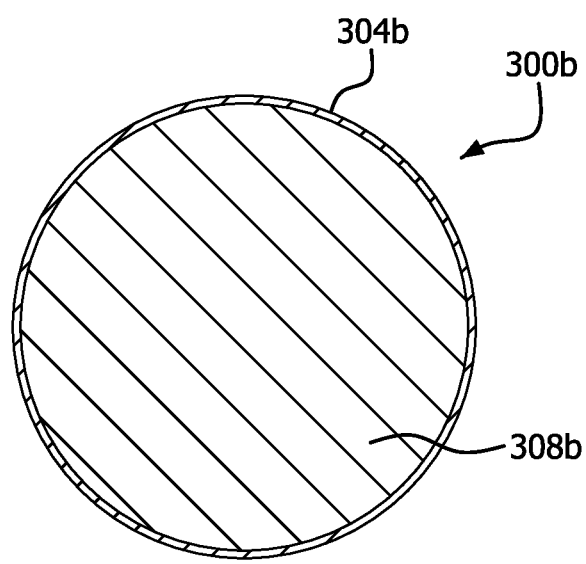
FIG. 13  FIG. 14

DENSITY CONTROLLED PHASE-CHANGING MATERIAL (PCM) SPHERES FOR INCREASED HEATING POWER AND OPTIMAL DELIVERY TEMPERATURE IN HOT-WATER TANKS

CROSS-REFERENCE TO RELATED APPLICATIONS

This application claims priority to U.S. 63/237,239 filed on Aug. 26, 2021, entitled "Density Controlled Phase-Changing Material (PCM) Spheres for Increased Heating Power and Optimal Delivery Temperature in Hot-Water Tanks", the entire disclosure of which incorporated herein by reference.

STATEMENT REGARDING FEDERALLY SPONSORED RESEARCH AND DEVELOPMENT

This invention was made with government support under Contract No. DE-AC05-00OR22725 awarded by the United States Department of Energy. The government has certain rights in this invention.

FIELD OF THE INVENTION

The present invention relates generally to energy storage, and more particularly to energy storage associated with heating water.

BACKGROUND OF THE INVENTION

Electric utilities face an infrastructure problem due to ever increasing electric demands. Hot-water heating by electric resistance heaters causes significant peaking issues for the utilities as the demand for hot water usually occurs early in the morning and in the evening. Thermal-energy storage can help alleviate the peaking issued for utilities.

The first-hour rating (FHR) is an industry-standard metric for hot water heaters. The withdrawal of hot water during use causes new cold water to enter the tank, usually from near the bottom, to replace the amount lost. This mixing of cold water with the hot water remaining in the tank causes the overall water temperature inside the tank to drop. A water heater element will heat the cold water within the tank as the hot water is withdrawn and the cold water enters the tank and mixes with the remaining hot water in the tank. Most residential water heaters are designed to deliver water at the temperature of a set point and a predetermined range of temperatures, for example a 20 degree drop of temperature from the set point. A typical water heater is designed to deliver only about 70% of its capacity within the desired temperature range without undergoing a recovery in which heating components are engaged.

Increasing the first hour rating for a given size tank will have the effect of reducing the tank size necessary for a given usage level. This will conserve energy and reduce cost. Phase change materials have been proposed for use in heat storage for water-based systems. Such systems include those described in Trant et al. U.S. Ser. No. 10/458,678; Field et al US20200217518A1; Suresh et al "Experimental study on combined sensible-latent heat storage system for different volume fractions of PCM", Solar Energy 212 (2020) 282-296; and Kenisarin et al. "Melting and solidification of PCMs inside a spherical capsule: A critical review", Journal of Energy Storage Volume 27, February 2020, 101082. The heat transfer performance of phase change materials is quite low, limiting the applications in which they can be used.

SUMMARY OF THE INVENTION

A medium includes a plurality of capsules. Each capsule includes a phase changing material (PCM) configured to undergo a liquid-solid phase transition at a solidification temperature, $T_S$. The PCM undergoes a relative volume change due to the phase transition. A shell is filled with the PCM. The shell comprises a first heat-conducting material, and the shell is configured to comply to the relative volume change. The relative volume change is configured to cause a buoyancy force which acts on the capsule when the capsule is disposed in water at a water temperature, $T_w$, to be larger than the capsule's weight for $T_w > T_s$, and equal to or smaller than the capsule's weight for $T_w < T_s$.

The medium can further include a second heat-conducting material with higher heat conductance than the first heat-conducting material. A portion of the second heat-conducting material can be disposed inside the shell and in thermal contact with the PCM, and another portion of the second heat-conducting material protrudes outside the shell. The capsule can have a smallest dimension and the second heat-conducting material can protrude outside the shell by a length larger than about 10% of the smallest dimension. The inside-the-shell portion of the second heat-conducting material can be configured as a coil, and the outside-the-shell portion of the second heat-conducting material can be configured as a fin. The second heat-conducting material can include a metallic wire. The metallic wire can include Al or Cu. The metallic wire can be stranded, and the strands of the inside the shell portion can be expanded. The length of the outside-the-shell portion of the second heat-conducting material can be within a range of 0.1-10 times the size of the shell. The PCM can encapsulate the inside-the-shell portion of the second heat-conducting material.

The shell can encapsulate a fraction of air less than 1-3% by volume. The shell can be shaped as one of a spherical shell or a tubular shell. Other shapes are possible. The first heat-conducting material of the shell can include a plastic material configured to conduct heat. The PCM can include one of an organic PCM or a food-grade PCM. A gas capsule can be secured to or within the shell. The $T_s$ can be within ±5° F. of a design water temperature $T_o$ at the outlet of a water tank. The capsule can be neutrally buoyant in water at $T_o$.

A system for heating water includes one or more tanks. Each of the tanks is configured to hold water. An inlet is coupled with one of the tanks to receive water at an input water temperature $T_{wi}$. Means such as a heating element or other device is provided for changing the temperature of at least a portion of the received water to a target water temperature $T_{wt}$. An outlet is coupled with one of the tanks to output the water at an outlet water temperature $T_{wo}$.

A plurality of capsules are provided. Each capsule includes a phase changing material (PCM) configured to undergo a liquid-solid phase transition at a solidification temperature, $T_s$, wherein the PCM undergoes a relative volume change due to the phase transition. A shell is filled with the PCM. The shell comprises a first heat-conducting material, and is configured to comply to the relative volume change. The relative volume change is configured to cause a buoyancy force, which acts on the capsule when the capsule is disposed in water at a water temperature, $T_w$, to be larger than the capsule's weight for $T_w > T_s$, and equal to or smaller than the capsule's weight for $T_w<T_s$. The capsules are immersed in the water held by the tank coupled with the outlet. The water when heated in the tank causes the temperature inside the capsules to rise to or above $T_S$. The PCM undergoes a solid-to-liquid phase transition. The charged capsules are configured to float above the level of the outlet, and store latent heat captured during the PCM's solid-to-liquid phase transition. The water in the tank when cooled causes the temperature inside the capsules to drop to or below $T_S$. The PCM undergoes a liquid-to-solid phase transition. The discharged capsules are configured to float adjacent to the level of the outlet, and release the stored latent heat.

The system can include a thermally stratified tank coupled with the inlet and with the outlet. The capsules can be immersed in the thermally stratified tank. The temperature of water at the outlet of the thermally stratified tank is $T_{wo}$, and the capsule can be configured to be neutrally buoyant at $T_{wo}$. The capsule s can be configured to be neutrally buoyant in water within a range of ±5° F. of $T_{wo}$. The $T_s$ can be from 115° F. to 155° F., and $T_{wo}$ is 110° F. to 160° F.

The capsules of the system can further comprise a second heat-conducting material with higher heat conductance than the first heat-conducting material, wherein a portion of the second heat-conducting material is disposed inside the shell and in thermal contact with the PCM, and another portion of the second heat-conducting material protrudes outside the shell. The outside-the-shell portion of the second heat-conducting material can be configured to extend vertically across two or more thermal layers of the thermally stratified tank to cause the temperature inside the capsules to drop to $T_S$, even when the water temperature $T_w$ adjacent to the immersed capsules is higher than $T_S$.

The system can include a thermally stratified tank coupled with the inlet. A thermal-energy storage tank can be coupled with the stratified tank and with the outlet, wherein the capsules are immersed in the thermal-energy storage tank.

A method of heating water can include the step of providing a tank for the water. The tank has an upper portion and a lower portion, and a water outlet and a water inlet. The water outlet can be positioned between the upper portion and the lower portion. A plurality of capsules can be provided in the tank. Each capsule can include a phase changing material (PCM) configured to undergo a liquid-solid phase transition at a solidification temperature, $T_S$, wherein the PCM undergoes a relative volume change due to the phase transition. A shell is filled with the PCM, wherein the shell includes a first heat-conducting material, and is configured to comply to the relative volume change. The relative volume change is configured to cause a buoyancy force, which acts on the capsule when the capsule is disposed in water at a water temperature, $T_w$, to be larger than the capsule's weight for $T_w>T_s$ and equal to or smaller than the capsule's weight for $T_w<T_s$. The water in the tank is heated to a target water temperature $T_{wt}$. Water is withdrawn from the water outlet while inputting water through the water inlet. The withdrawn water has a temperature $T_{wo}$ that is higher than the temperature $T_{wi}$ of the inputted water and lower than $T_{wt}$, creating a stratified water temperature tank with a graduated water temperature decreasing from the upper portion to the lower portion. The PCM in the capsule will solidify and the capsules will sink in the stratified tank. The capsules can be neutrally buoyant at a water temperature±5° F. of $T_{wo}$.

BRIEF DESCRIPTION OF THE DRAWINGS

There are shown in the drawings embodiments that are presently preferred it being understood that the invention is not limited to the arrangements and instrumentalities shown, wherein:

FIG. 11 is a side elevation of a PCM capsule in a first mode of operation.

FIG. 12 is side elevation of the PCM capsule of FIG. 11, in a second mode of operation.

FIG. 13 is a cross-section taken along line 13-13 in FIG. 11.

FIG. 14 is cross-section taken along line 14-14 in FIG. 12.

DETAILED DESCRIPTION OF THE INVENTION

Figure 1:
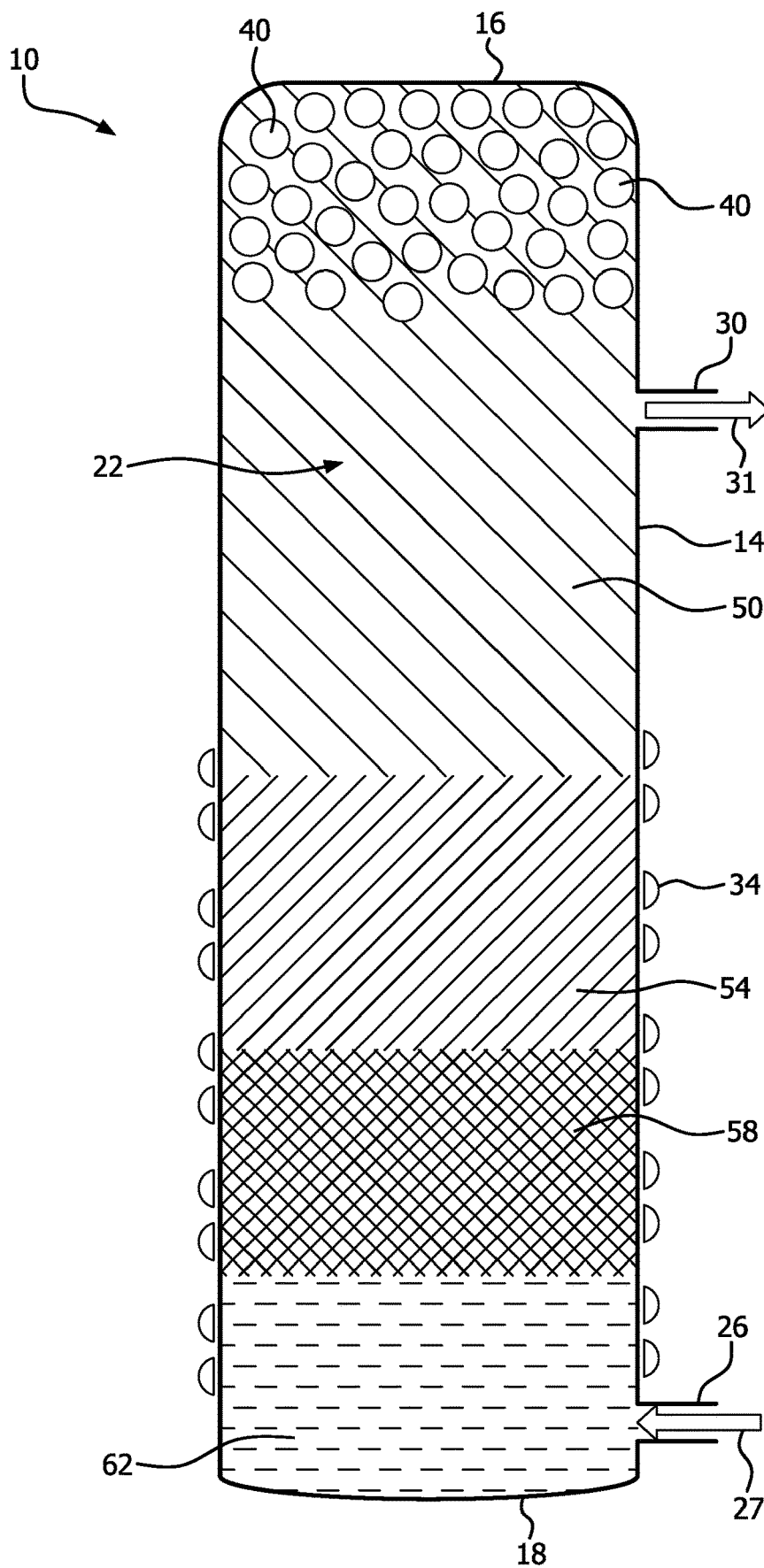
FIG. 1 is a schematic cross-section of a system for heating water, in a first mode of operation.

A medium for energy storage includes a plurality of capsules. Each capsule contains a phase changing material (PCM) configured to undergo a liquid-solid phase transition at a solidification temperature, $T_S$. The PCM undergoes a relative volume change due to the phase transition. A shell is filled with the PCM. The shell contains a first heat-conducting material, and is configured to comply to the relative volume change. The relative volume change is configured to cause a buoyancy force, which acts on the capsule when the capsule is disposed in water at a water temperature, $T_W$, to be larger than the capsule's weight for $T_w > T_s$, and equal to or smaller than the capsule's weight for $T_w < T_s$. The $T_s$ can be within ±5° F. of a design water temperature $T_o$ at the outlet of a water tank. The capsule can be neutrally buoyant in water at $T_o$.

The medium can further include a second heat-conducting material with higher heat conductance than the first heat-conducting material. A portion of the second heat-conducting material is disposed inside the shell and in thermal contact with the PCM, and another portion of the second heat-conducting material protrudes outside the shell.

The capsule can have a smallest dimension and the second heat-conducting material can protrude outside the shell by a length larger than about 10% of the smallest dimension. The inside-the-shell portion of the second heat-conducting material can be configured as a coil, and the outside-the-shell portion of the second heat-conducting material can be configured as a fin or a wire. Other shapes are possible. The length of the outside-the-shell portion of the second heat-conducting material is within a range of 0.1-10 times the size of the shell at $T_s$. The PCM can encapsulate the inside-the-shell portion of the second heat-conducting material.

Air trapped within the capsule influences buoyancy and should be avoided. The shell can encapsulate a fraction of air less than 1-3% by volume. The shell can be shaped as one of a spherical shell or a cylindrical or tubular shell. Other shapes are possible. The dimensions of the capsule can vary.

The first heat-conducting material of the shell can include a plastic material configured to conduct heat, such as polyurethane, polypropylene, high temperature silicone, and flexible carbon-fiber composites. Other plastics are possible. The second heat-conducting material can be a metal. The metal wire can include Al or Cu. Other metals are possible.

Many different PCM materials are possible. Some PCMs are organic and occur in nature, such as paraffins, fatty acids, easter, alcohols and glycols. Inorganic PCMs include salt hydrates and metallic materials. Suitable PCMs include sodium acetate trihydrate, magnesium nitrate hexahydrate, magnesium chloride hexahydrate, and sodium nitrite. Other PCMs are possible. These types of PCMs can be engineered to have any phase change temperature—not only 0° C. in the case of water. Another type of PCMs are eutectics, which can be a mixture of organic or inorganic PCMs to create unique phase change temperatures. The latent heat capacity of PCMs can range from 30 to 250 kJ/kg. The utilization rate—the heating power delivered to hot-water, of PCM in hot-water storage tanks is highly related to the conductivity of the PCM. PCMs also pose unique heat transfer problems as the conductivity can change significantly when in the liquid or solid state. Techniques that will increase the heating power include doping the PCMs with high conductivity metals. Other high-conductivity materials that can be used to dope the PCMs includes carbon nano-rod fins.

Selecting the melting temperature of the PCM is critical and should be near the desired outlet temperature of the hot-water tank. Three deployment strategies for PCMs include inside the tank, outside the tank between the wrap of the condenser, and outside the tank with a coil embedded in the PCM. Nonhazardous and nontoxic PCMs are deployed inside the tank, which limits the PCM selection to some organic PCMs and food-grade PCMs. Organic PCM, such as bees wax, melts at the correct temperature but can be expensive. Food grade PCMs are commonly mass produced and cost less than $20/kg to the consumer, and wholesale market prices could be even lower.

A wider range of PCMs can be used when installed between the tank and the condenser coil, or when the coil is submerged inside a tank full of PCM, as there are two walls between the refrigerant and the hot water. The PCMs with higher conductivity tend to be mildly toxic are good options for these deployment strategies outside of the tank. These PCMs can be salt hydrates such as sodium acetate trihydrate.

A system for heating water includes one or more tanks. Each of the tanks is configured to hold water. An inlet is coupled with one of the tanks to receive water at an input water temperature $T_{wi}$. Means are provided for changing the temperature of at least a portion of the received water to a target water temperature $T_{wt}$. An outlet is coupled with one of the tanks to output the water at an outlet water temperature $T_{wo}$. A plurality of capsules are provided. Each capsule includes a phase changing material (PCM) configured to undergo a liquid-solid phase transition at a solidification temperature, $T_s$, wherein the PCM undergoes a relative volume change due to the phase transition. A shell is filled with the PCM. The shell includes a first heat-conducting material, and the shell is configured to comply to the relative volume change. The relative volume change is configured to cause a buoyancy force, which acts on the capsule when the capsule is disposed in water at a water temperature, $T_w$, to be larger than the capsule's weight for $T_w > T_s$, and equal to or smaller than the capsule's weight for $T_w < T_s$.

The capsules are immersed in the water held by the tank coupled with the outlet. Heating the water in the tank causes the temperature inside the capsules to rise to or above $T_S$, and the PCM undergoes a solid-to-liquid phase transition. The charged capsules are configured to float above the level of the outlet, and store latent heat captured during the PCM's solid-to-liquid phase transition. Cooling the water in the tank causes the temperature inside the capsules to drop to or below $T_S$, and the PCM undergoes a liquid-to-solid phase transition. The discharged capsules are configured to float adjacent to the level of the outlet, and release the stored latent heat.

The system can include a thermally stratified tank coupled with the inlet and with the outlet, and the capsules can be immersed in the thermally stratified tank. The temperature of water at the outlet of the thermally stratified tank is $T_{wo}$, and the capsule can be configured to be neutrally buoyant at $T_{wo}$. The capsule can be configured to be neutrally buoyant in water within a range of ±5° F. of $T_{wo}$. The value of $T_s$ can be from 115° F. to 155° F., and $T_{wo}$ can be from 110° F. to 160° F.

The capsules can further include a second heat-conducting material with higher heat conductance than the first heat-conducting material, wherein a portion of the second heat-conducting material is disposed inside the shell and in thermal contact with the PCM, and another portion of the second heat-conducting material protrudes outside the shell. The outside-the-shell portion of the second heat-conducting material is configured to extend vertically across two or more thermal layers of the thermally stratified tank to cause the temperature inside the capsules to drop to $T_S$, even when the water temperature $T_w$ adjacent to the immersed capsules is higher than $T_S$. The system can include a thermally stratified tank coupled with the inlet, and a thermal-energy storage tank coupled with the stratified tank and with the outlet. The capsules are immersed in the thermal-energy storage tank.

A method of heating water includes the step of providing a tank for the water, having an upper portion and a lower portion, a water outlet and a water inlet. The water outlet can be positioned between the upper portion and the lower portion. A plurality of capsules are provided in the tank. Each capsule includes a phase changing material (PCM) configured to undergo a liquid-solid phase transition at a solidification temperature, $T_S$, wherein the PCM undergoes a relative volume change due to the phase transition, and a shell filled with the PCM. The shell comprises a first heat-conducting material, and the shell is configured to comply to the relative volume change. The relative volume change is configured to cause a buoyancy force, which acts on the capsule when the capsule is disposed in water at a water temperature, $T_w$, to be larger than the capsule's weight for $T_w > T_s$ and equal to or smaller than the capsule's weight for $T_w < T_s$.

The water in the tank is heated to a target water temperature $T_{wt}$. The water is withdrawn from the water outlet while inputting water through the water inlet. The withdrawn water has a temperature $T_{wo}$ that is higher than the temperature $T_{wi}$ of the inputted water and lower than $T_{wt}$, creating a stratified water temperature tank with a graduated water temperature decreasing from the upper portion to the lower portion. The PCM in the capsule will solidify and the capsules will sink in the stratified tank. The capsules can be neutrally buoyant at a water temperature±5° F. of $T_{wo}$.

The density of the controlled phase-changing material (PCM) spheres for increased heating power and optimal delivery temperature in hot-water tanks. The deployment strategy for the PCM capsules used herein shows the ability of the PCM capsules to drop to the location of an outlet to discharge their energy, for example 450 watts for 15 minutes, during hot water draws. When recharged, the PCM capsules can float above the outlet and remain ready for the next discharge cycle. The design of the PCM capsules is critical to the heat transfer performance and fluid dynamics under flow conditions. High heat transfer rates are required to reach 450 watts, large storage capacity is required to sustain the heat transfer, and the forces on the capsule due to the flow condition and gravity need to be balanced to allow for neutral buoyancy below the desired outlet temperature.

Water heating is an energy intense process. After space heating and space cooling, water heaters are among the largest energy users for both residential and commercial applications. Heat pump water-heaters (HPWHs) with storage tanks have been, perhaps the first attempt to store energy. Significant developments have been made to leverage the storage capability including optimizing the performance based on thermal stratification and developing a grid interactive framework. HPWHs are much more efficient than conventional water heaters with potential to reduce energy consumption by more than 50%. In the recent years, HPWH have emerged as a promising technology to further enhance the thermal storage capability. HPWH technology offers potential improvement in the capacity of the water heater and a highly flexible framework for distributed energy storage to shift the load. The invention can be used to further improve the storage capability deploying storage media with higher capacity (kW/kg and kW/m³) and improved process control.

The invention can be used with stand-alone storage system, for example with split systems. The invention can also be used with embedded energy storage solution, such as integrated packaged units. The embedded configuration has the advantage of improved logistics, such as reduced engagement for third part vendor, and minimal increase in the cost of the system and footprint. Ultimately, the performance of a thermal energy storage system that is incorporated with a hot water system is based on the energy density which characterizes the amount of energy storable and the heating power that can be provided to the water when the energy store material is discharging.

The method for making the PCM spheres can vary. In one embodiment a hole is provided on both sides of each capsule shell. A wire is twisted into a coil. The wire is inserted into the shell. The PCM material is melted. The PCM assembly is placed into the melted PCM material. A vacuum is pulled and the PCM material is mixed gently. The PCM capsules are placed in water bath until solid throughout. The outside of the PCM capsule is heated to melt excess wax. The capsules are cleaned, and then placed into a water bath. A sealant such as silicone is applied to seal the hole created for the wire.

There is shown in FIGS. 1-5 a system 10 for heating water comprising a tank 14 with a top 16, a bottom 18, and an open interior 22. The tank 14 includes a cold-water inlet 26 for inputting water as shown by arrow 27, and a hot water outlet 34 outputting water as shown by arrow 31. The hot-water outlet 30 is typically provided above the cold-water inlet 26. Heating elements 34 of suitable design and construction are typically provided in the bottom half of the tank 14 and heat the water such that the hot-water will rise to the top of the tank 14 and exit from the hot-water outlet 30. Due to the reduced density of hot-water relative to water at a lower temperature, the water in the tank will tend to stratify into a hot-water region at the top of the tank and cooler regions further toward the bottom 18. Within the tank 14 there are PCM capsules 40. When the water within the tank is at the steady-state setpoint, the PCM capsules 40 will be at the maximum temperature and will float near the top 16 of the tank 14.

In the drawings there is shown a stratified water layers with a hot-water layer 50 at the top of the tank, and a cooler layer 54, an intermediate temperature layer 58, and a cold-water layer 62 at or near the bottom of the tank and nearest the cold-water inlet 26 such that this bottom layer 62 will have the coldest temperatures. It should be appreciated that are that although four such temperature layers are shown, this is for purposes of understanding and purposes of explanation and due to mixing and convection these layers will not be so well defined and will be a gradient of possibly many more layers.

Figure 2:
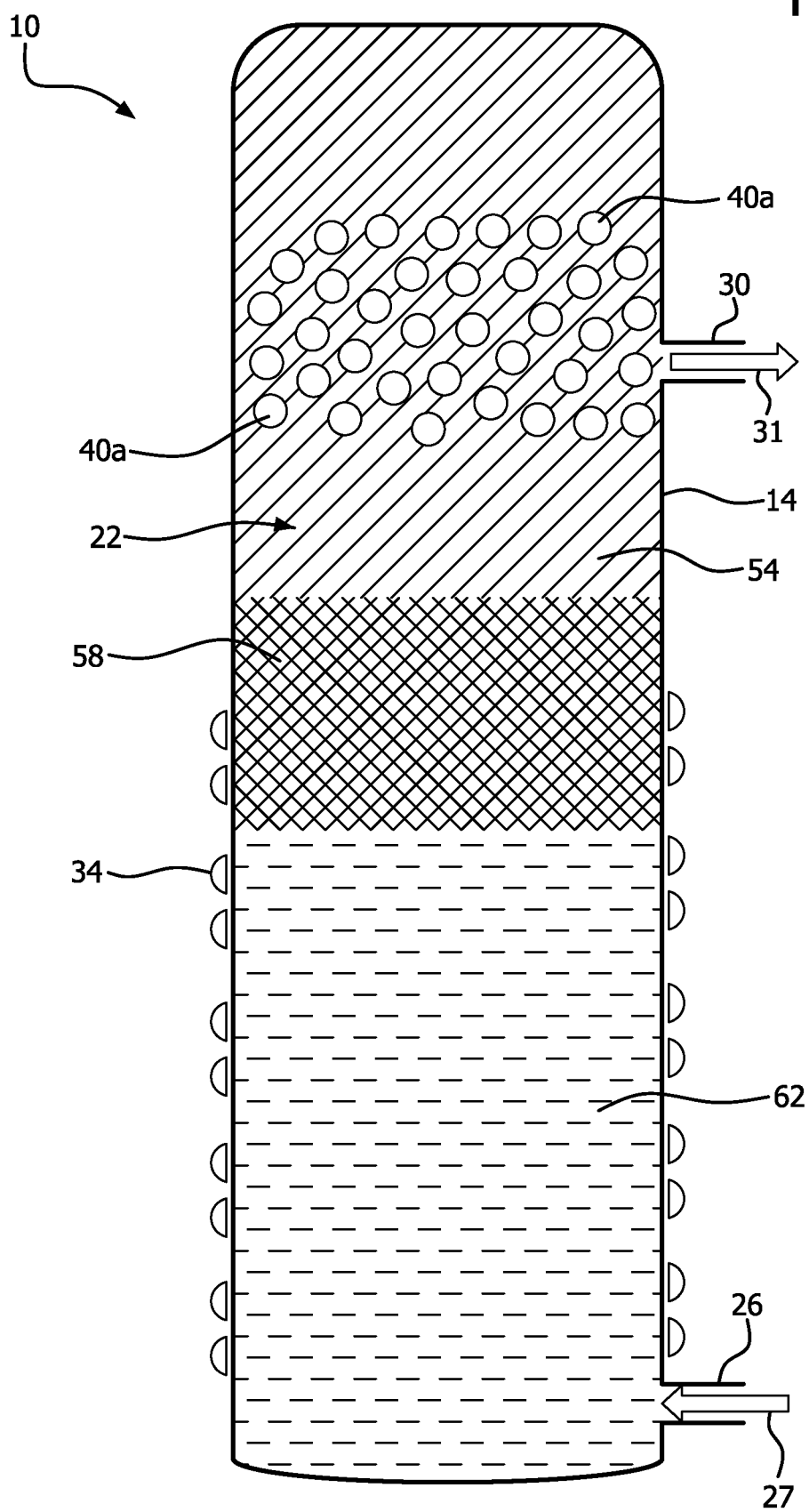
FIG. 2 is a schematic cross-section of the system for heating water of FIG. 1, in the second mode of operation.
Figure 3:
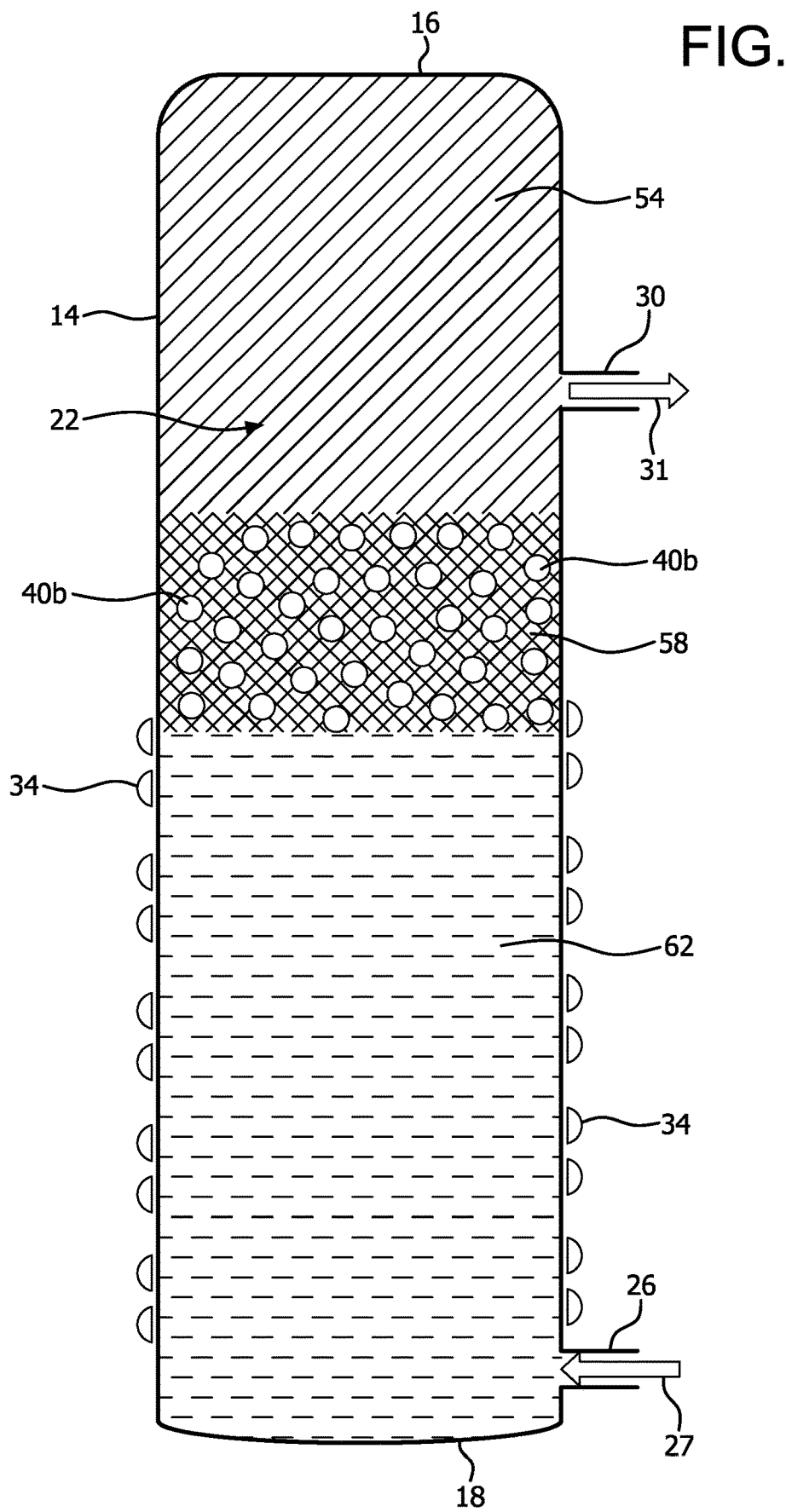
FIG. 3 is a schematic cross-section of the system for heating water of FIG. 1, in the third mode of operation.
Figure 4:
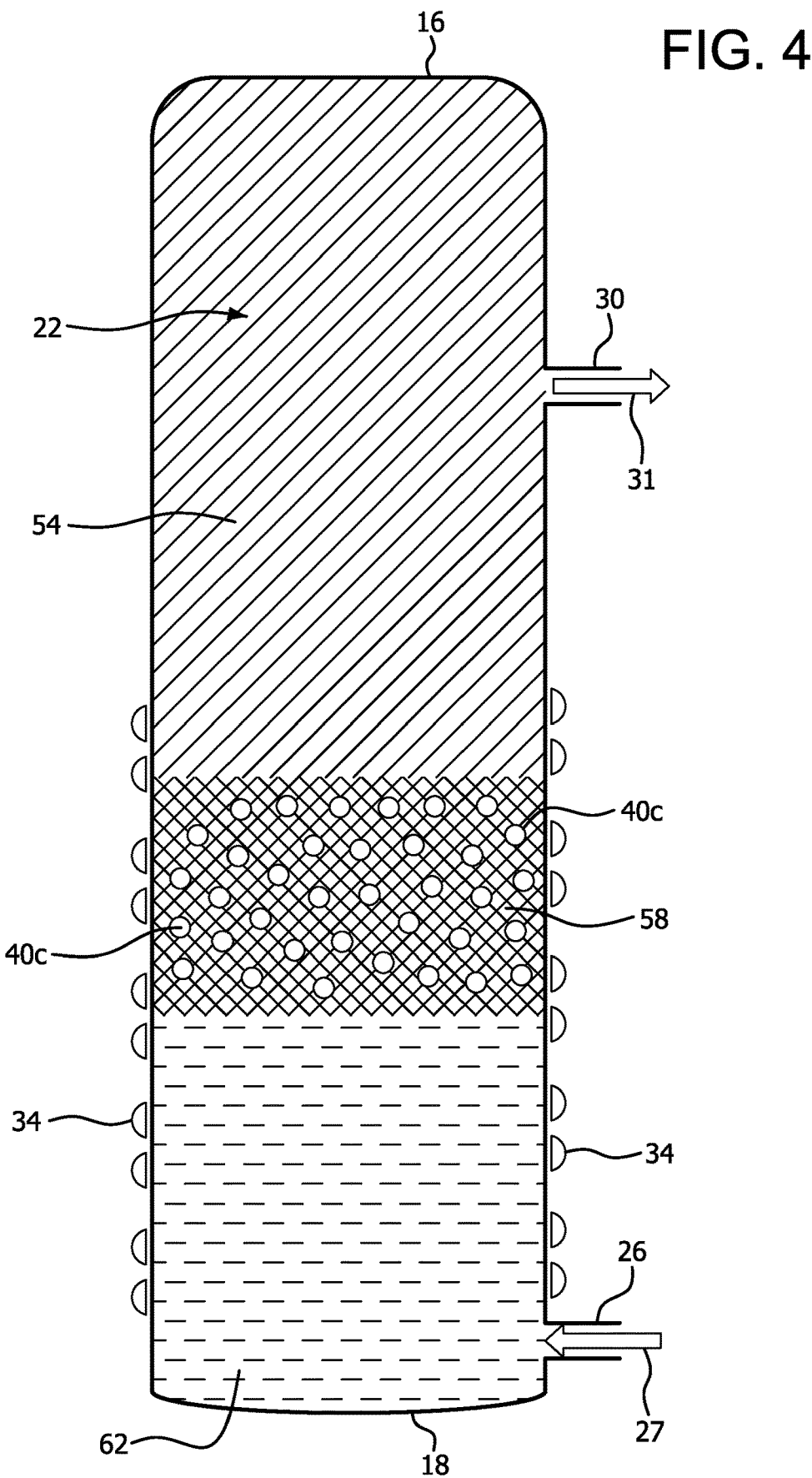
FIG. 4 is a schematic cross-section of the system for heating water of FIG. 1, in the fourth mode of operation.
Figure 5:
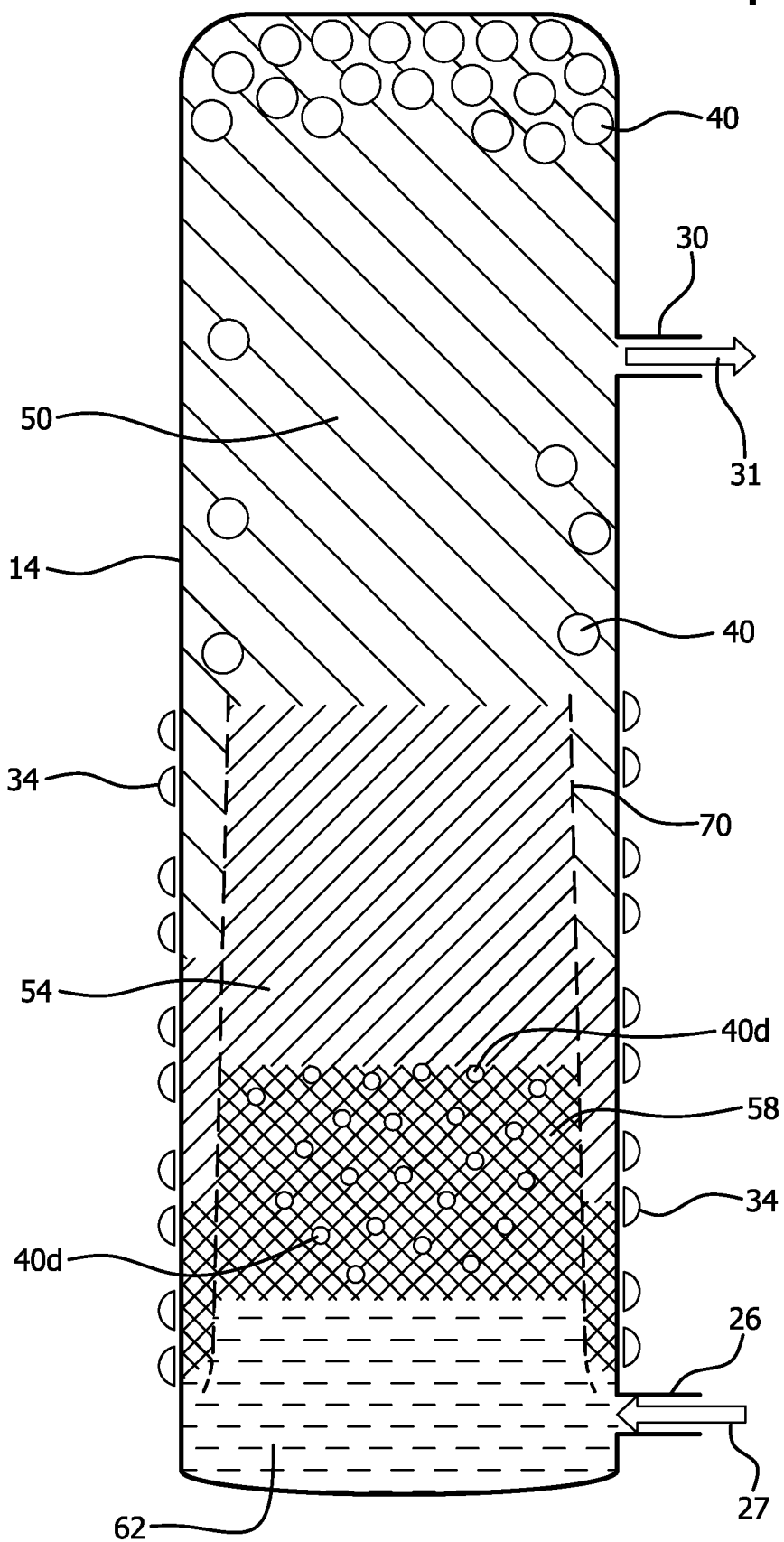
FIG. 5 is a schematic cross-section of the system for heating water of FIG. 1, in the fifth mode of operation.

FIG. 1 is a schematic cross-section of a system for heating water, in a first mode of operation. Hot-water is withdrawn from the hot-water outlet 30 as shown by arrow 31, and cold water is introduced into the tank 14 by the cold-water inlet 26 as shown by the arrow 27. Water temperatures in the tank are stratified for example into hot layer 50, temperate layer 54, intermediate layer 58, and cold layer 62. FIG. 2 is a schematic cross-section of the system for heating water of FIG. 1, in the second mode of operation in which the withdrawal of water has continued. The PCM capsules 40 are exposed to a reduced temperature as indicated by temperate layer 54 and the PCM material contracts as shown by PCM capsules 40a. During this contraction, 40a is releasing latent heat to the water in 54 to the water flowing towards the outlet at 30. The cold-water layer 62 increases as cold-water is rapidly introduced into the tank 14 through the cold-water inlet 26. FIG. 3 is a schematic cross-section of the system for heating water of FIG. 1, in the third mode of operation in which the cold-water layer 62 has increased in size and the PCM capsules have reduced in diameter further as shown by PCM capsules 40b, which are now neutrally buoyant at the temperature of the intermediate temperature layer 58. FIG. 4 is a schematic cross-section of the system for heating water of FIG. 1, in the fourth mode of operation in which the temperate layer 54 has increased further in size, due to the latent heat release of the PCM and the PCM capsules have shrunk in size as shown by PCM capsules 40c. FIG. 5 is a schematic cross-section of the system for heating water of FIG. 1, in the fifth mode of operation in which water is no longer being withdrawn through the outlet 30 and PCM capsules 40d are now located near the bottom of the tank 14. The heating of the tank is performed by the heating component (i.e., heat pump condenser coil or other heating method) 34 which heats the walls of the tank 14 and creates a heating zone near the walls as indicated schematically by boundary 70, that further heats via. water conduction and convection. As the PCM capsules 40 are heated the PCM material changes phase and liquifies, expanding the shell and decreasing the density of the capsules to the original state of the capsules 40, which float to the top and the hot layer 50 of the tank 16.

Figure 6:
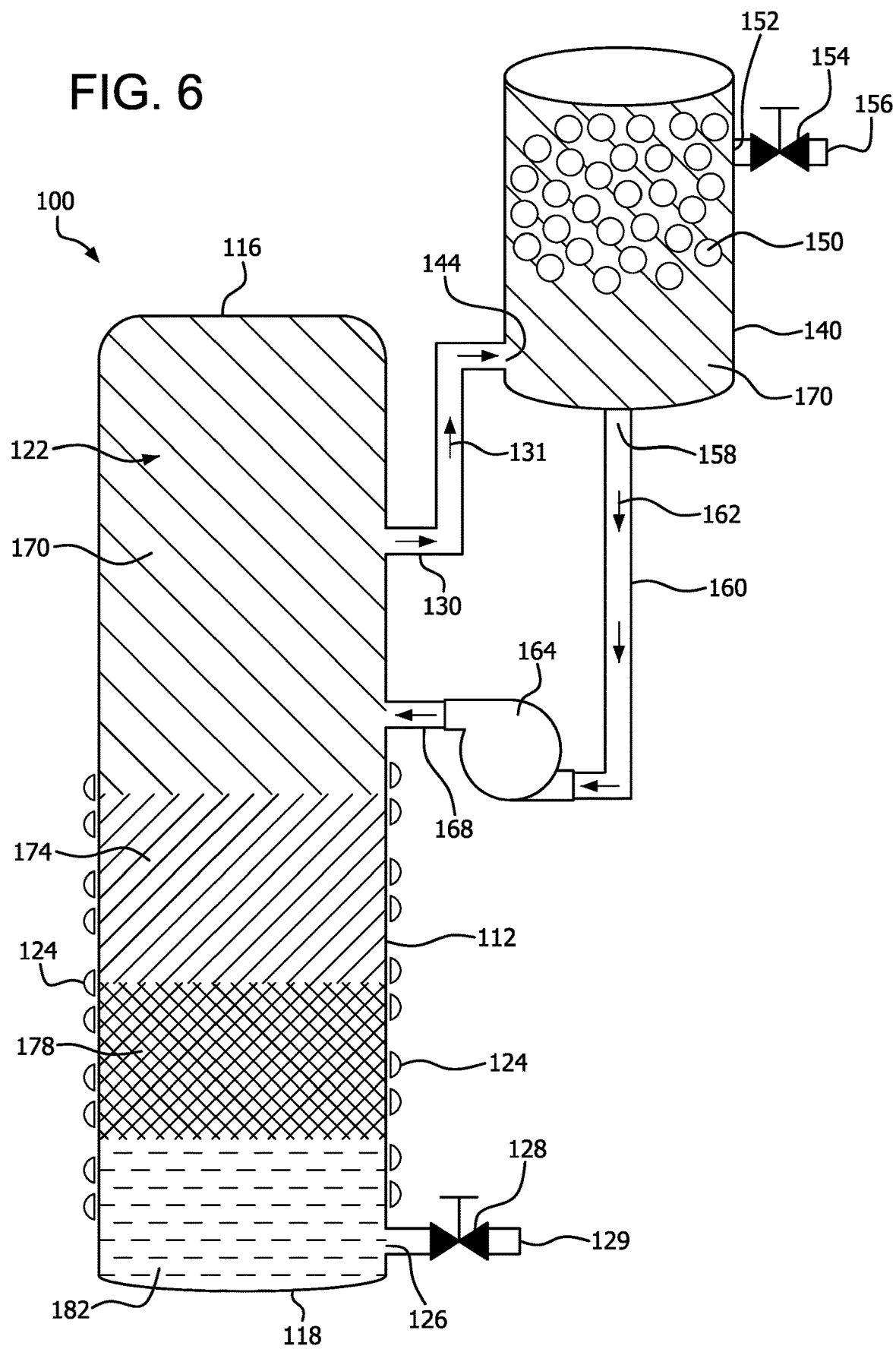
FIG. 6 is a schematic cross-section of an alternative embodiment, in a first mode of operation.

FIG. 6 is a schematic cross-section of an alternative embodiment of a system 100 for heating water, in which a tank 112 having a top 116 and bottom 118 has an open interior 122. The tank is heated by suitable heating elements 124. There is a cold-water inlet 126 controlled by a valve 128 and communicating with the cold-water source 129. A hot-water outlet 130 is provided and as indicated by arrows 131 hot-water flows to an energy storage tank 140 through a hot-water inlet 144. PCM capsules 150 are provided in the energy storage tank 140. The energy storage tank 140 has a hot-water outlet 152 controlled by valve 154 to a hot-water conduit 156. Water can recycle to the tank 112 through a recycle outlet 158 and recycle conduit 160 as indicated by arrow 162. A pump 164 can transport the water through hot-water return inlet 168. The water in the tank 112 is stratified into hot-water layer 170, temperate layer 174, intermediate layer 178 and cold layer 182.

Figure 7:
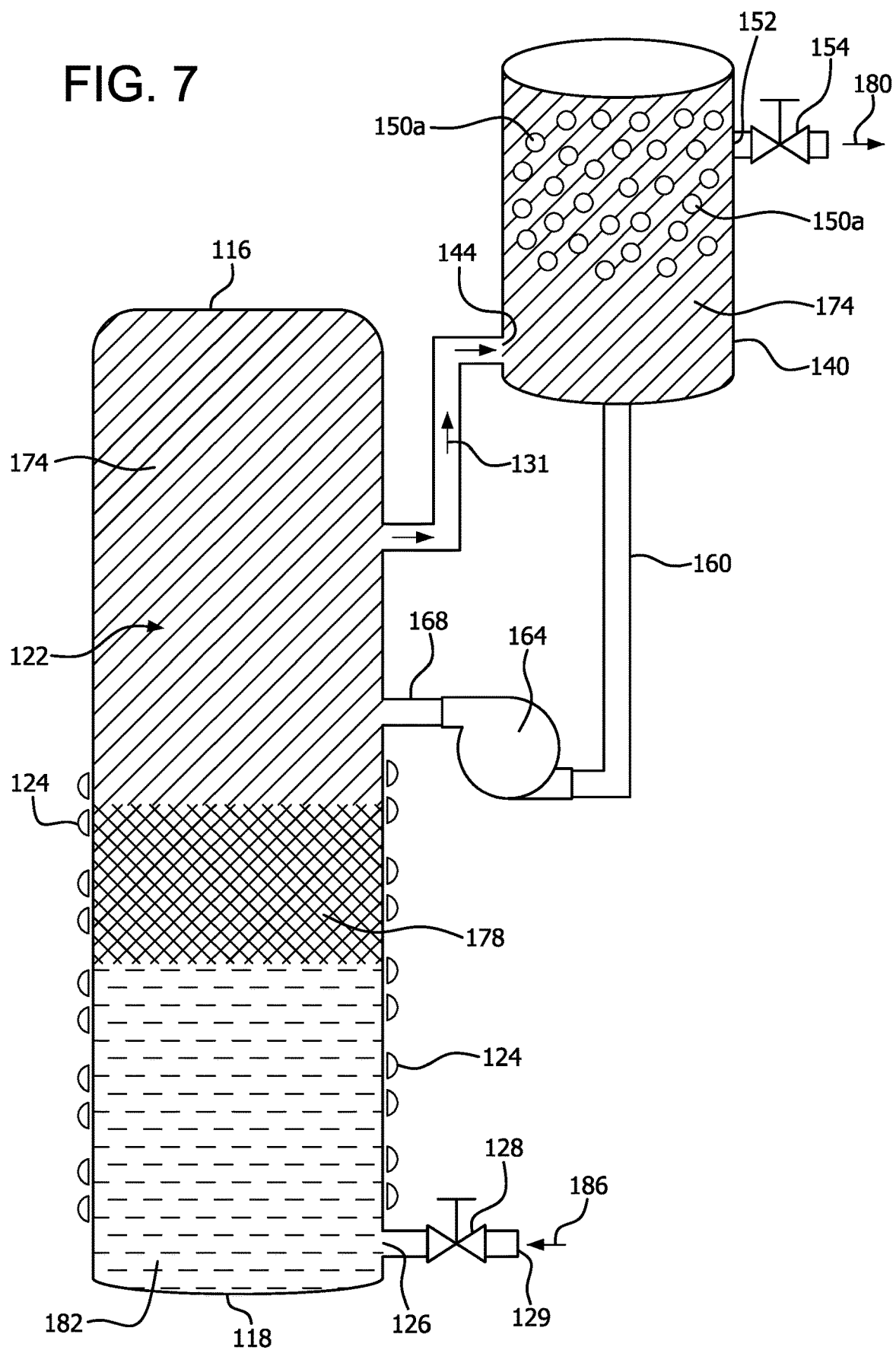
FIG. 7 is a schematic cross-section of the alternative embodiment of FIG. 6, in a second mode of operation.
Figure 8:
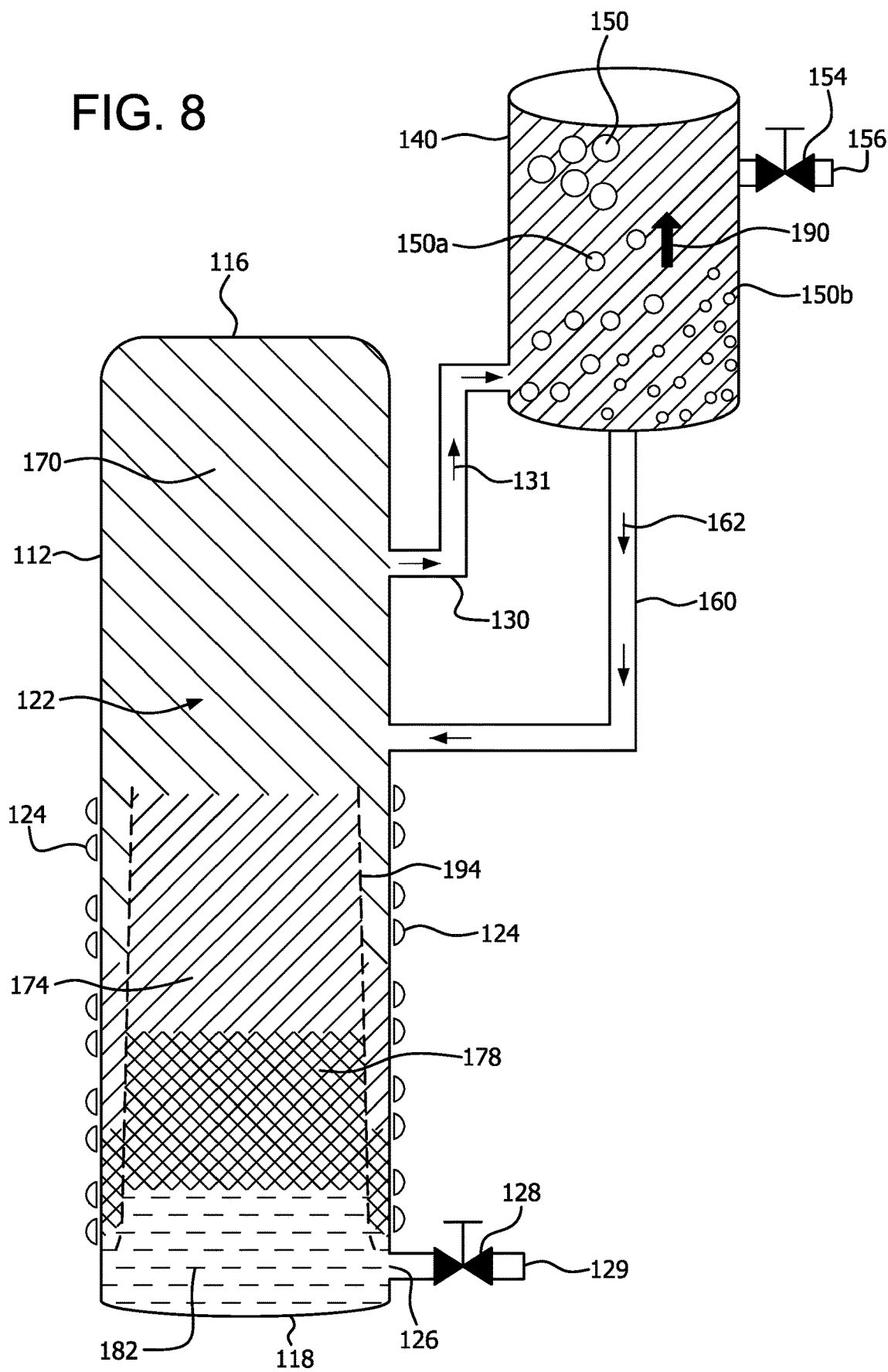
FIG. 8 is a schematic cross-section of the alternative embodiment of FIG. 6, in the third mode of operation.

FIG. 7 is a schematic cross-section of the alternative embodiment of FIG. 6, in a second mode of operation in which water is withdrawn by the user as indicated by arrow 180 when the valve 154 has been opened. Cooler water enters the tank 140 as indicated by arrow 131, and the PCM capsules 150 give off heat and reduce in size to that of PCM capsules 150a. The valve 154 is then closed. As shown in FIG. 8, in the third mode of operation the heating component 124 heat walls of the tank 112 and create a heating zone shown schematically by boundary 194. This will heat the water back to the setpoint temperature of hot layer 170 which will flow into the storage tank 140 and begin to heat the PCM capsules 150b to a warmer temperature. The PCM capsules will expand as they warm, lowering the density such that they rise as indicated by 150a until they reached the density and size shown by PCM capsules at the setpoint temperature. Natural convection will provide the motive force for circulation water through pipe 160 in the flow direction shown in 162.

Figure 9:
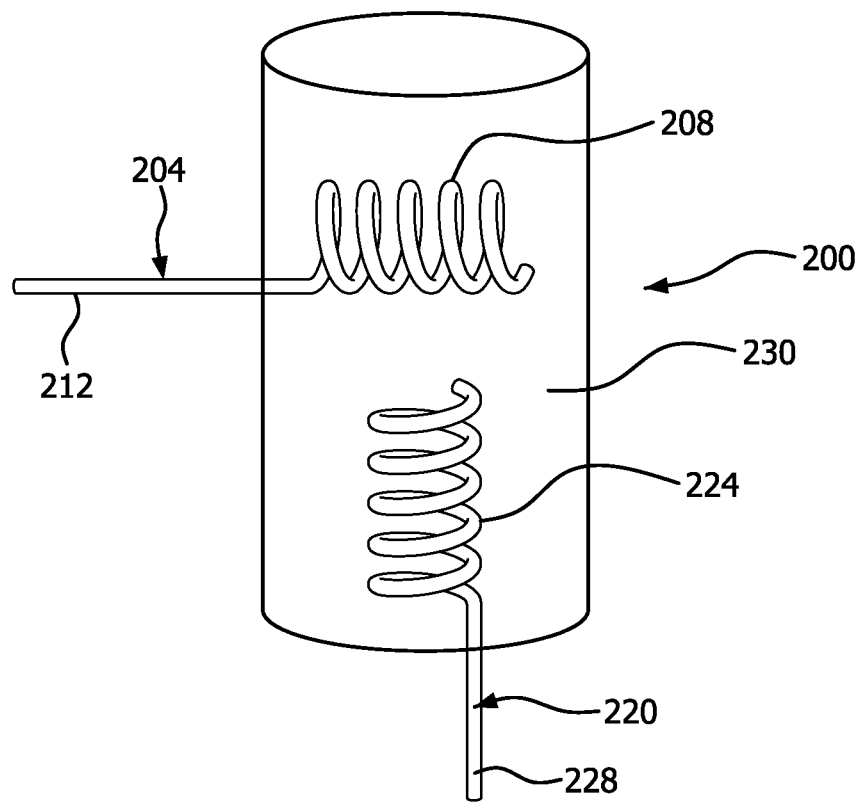
FIG. 9 is a schematic front perspective view of a phase change material (PCM) capsule.
Figure 10:
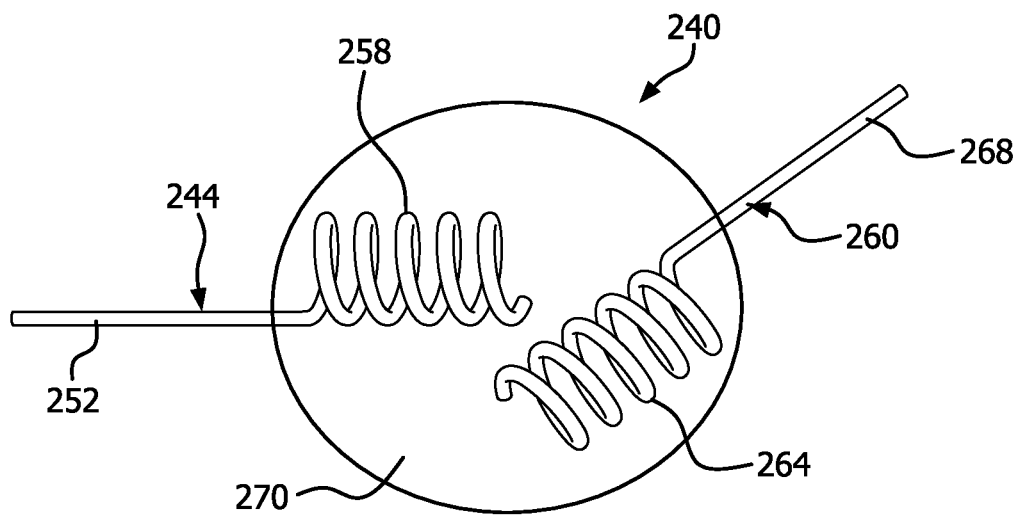
FIG. 10 is a schematic front perspective view of an alternative embodiment of a phase change material (PCM) capsule.
Figure 15:
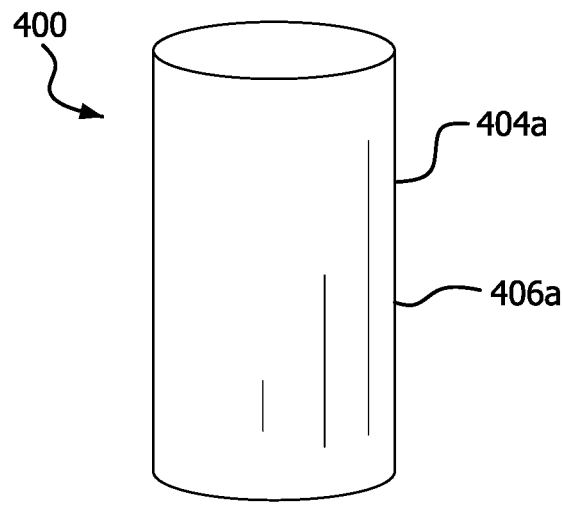
FIG. 15 is side elevation of an alternative PCM capsule, in a first mode of operation

FIG. 9 is a schematic front perspective view of a phase change material (PCM) capsule 200 in which a PCM material 230 within a shell made of a first heat-conducting material has embedded therein a conductor such as conductor 204 made from a second heat-conducting material. The conductor 204 has a portion 208 within the PCM material 230 which can be in the shape of a coil. A protruding portion or fin 212 extends out of the PCM material 230. Additional conductors such as second conductor 220 can also be made of a second heat-conducting material, and can be oriented in a different direction with the axis of coil 224 being vertical and the protruding portion 228 also being vertical. There is shown in FIG. 10 a PCM capsule 240 wherein conductors 244 and 260 made of a second heat conducting material are embedded within a spherical PCM capsule 270 with a shell made from a first heat-conducting material. The conductor 244 can have a coil 258 and a protruding portion 252. The conductor 260 can have a coil 264 and the protruding portion 268.

FIG. 11 is a side elevation of a PCM capsule in a first mode of operation. At the cold temperature the PCM capsule 300a has a reduced diameter and the shell 304 is also reduced. As the PCM capsule 300 is heated the PCM material changes phase and the capsule expands as indicated by capsule 300b in FIG. 12. As shown in FIG. 13, the shell 304a is very thick and the PCM material 308a is in a first phase with a first density. As shown in FIG. 14, the PCM capsule is heated, the phase change material changes phase as indicated at 308b and expands reducing the density and stretching the shell to a reduced thickness as indicated at 304b.

Figure 16:
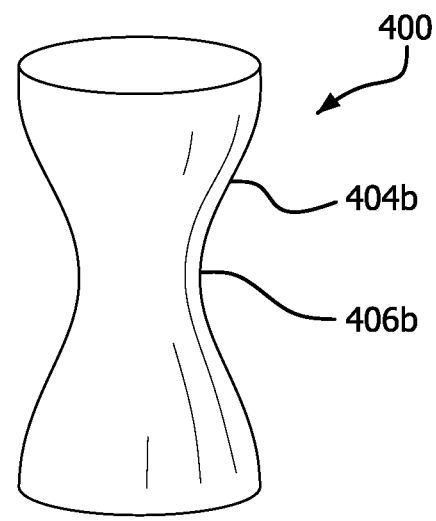
FIG. 16 is side elevation of the PCM capsule of FIG. 15, in a second mode of operation.
Figure 17:
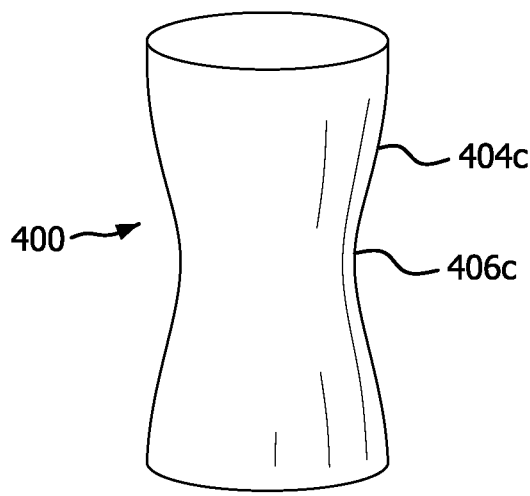
FIG. 17 is a side elevation of the PCM capsule of FIG. 15, in a third mode of operation.
Figure 18:
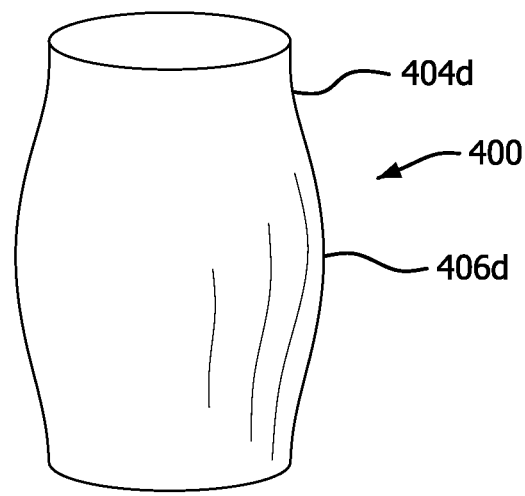
FIG. 18 is a side elevation of the PCM capsule of FIG. 15, in a fourth mode of operation.

There is shown in FIGS. 15-18 a cylindrical PCM capsule 400. In a first mode the walls 404a at the ends of the capsule 400 have the same diameter as the portion 406a at the center of the capsule 400. As the capsule 400 is cooled, the center portion 406b is reduced in dimension relative to the end portions 404b (FIG. 16). As the PCM capsule 400 is heated the PCM material changes phase and expands and the center portion 406c nears the dimensions of the end portions 404c (FIG. 17). As the capsule continues to be heated the center portion 406d will expand to a greater dimension than the end portions 404d (FIG. 18).

Figure 19:
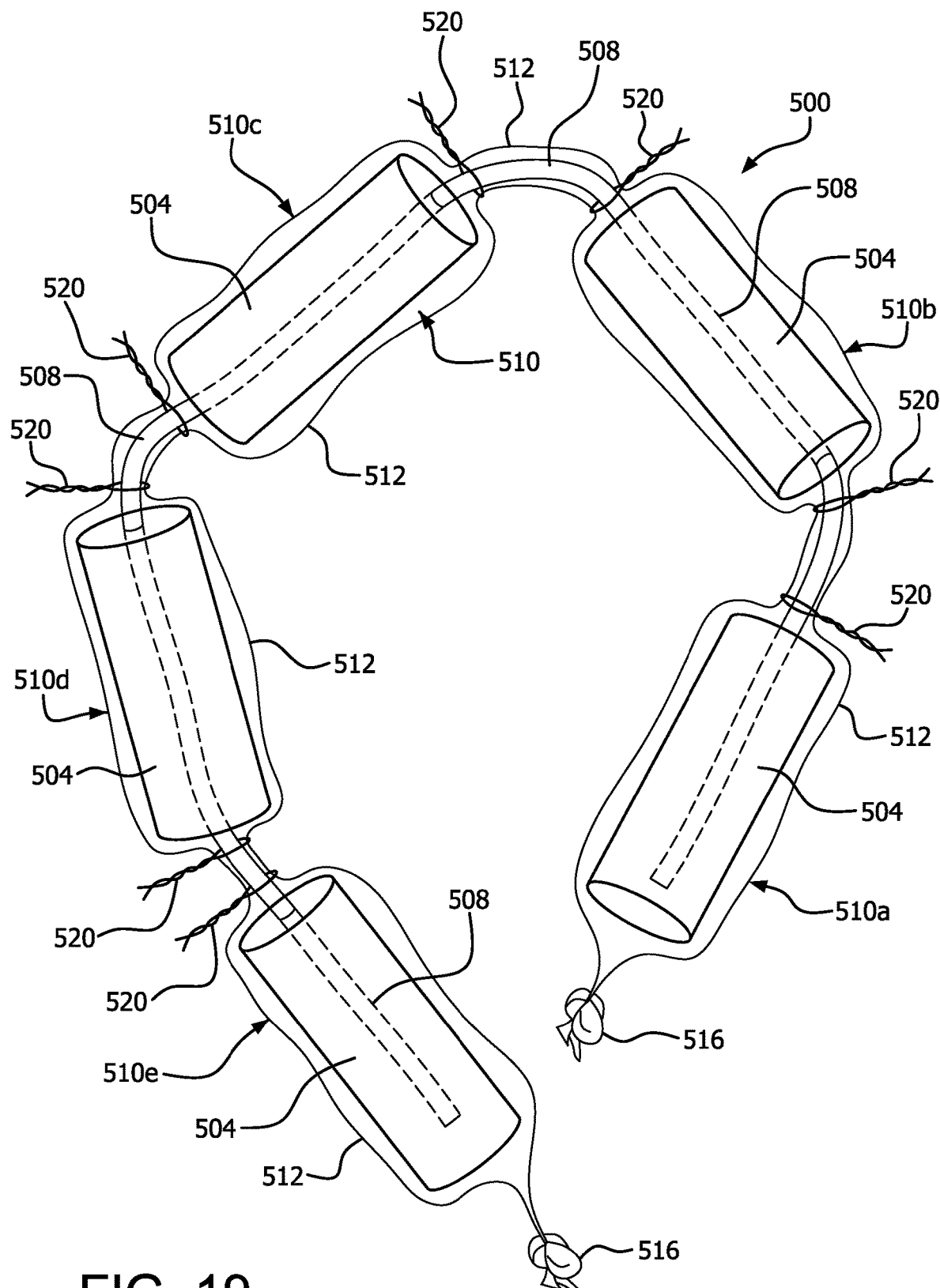
FIG. 19 is a schematic plan view of a segmented PCM capsule assembly, partially in phantom and partially broken away to reveal internal features.
Figure 20:
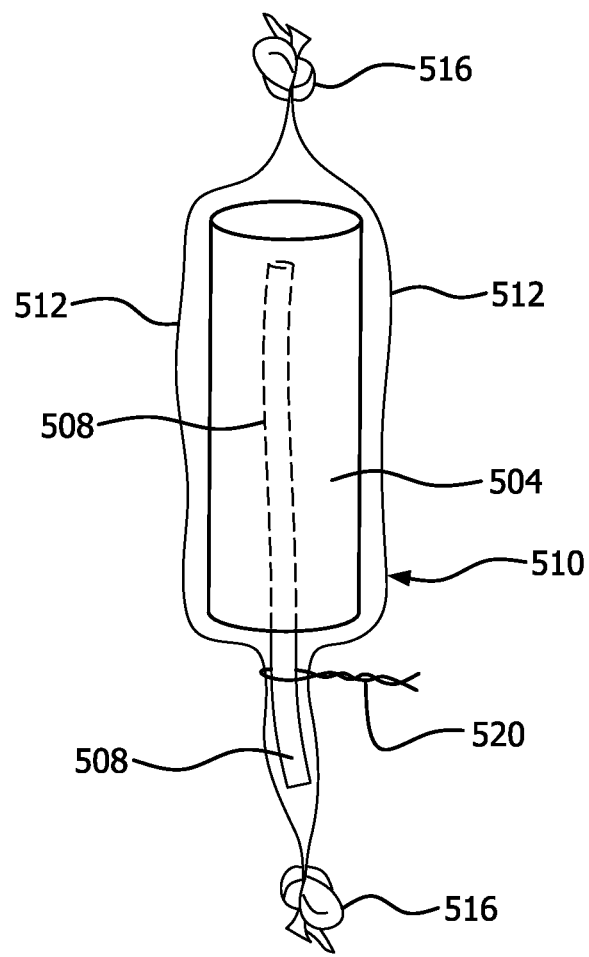
FIG. 20 is a schematic side elevation, partially broken away and partially in phantom, of a single segment of a PCM capsule.
Figure 21:
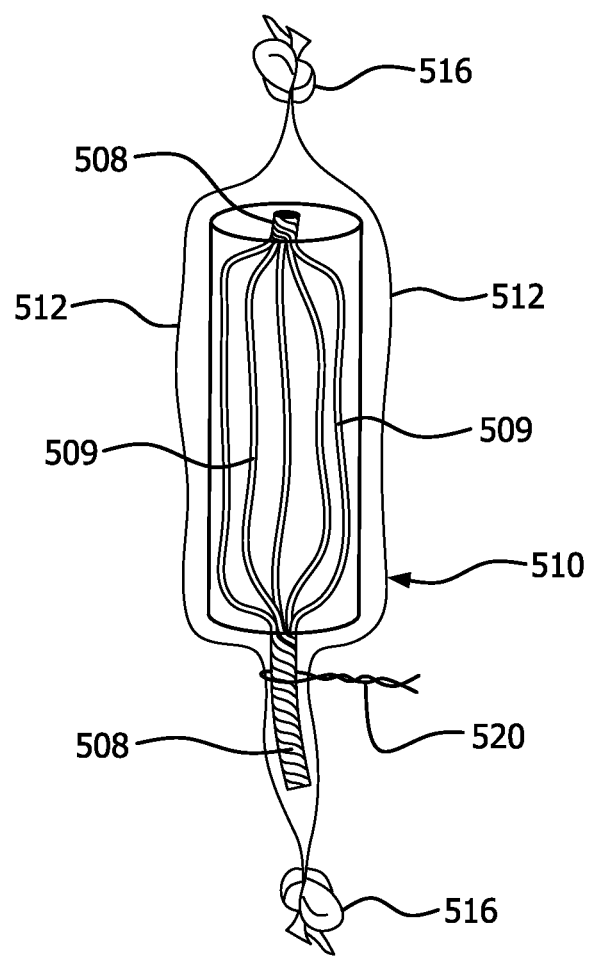
FIG. 21 a schematic side elevation, partially broken away and partially in phantom, of a single segment of a PCM capsule with an internally stranded secondary heat transfer medium.
Figure 22:
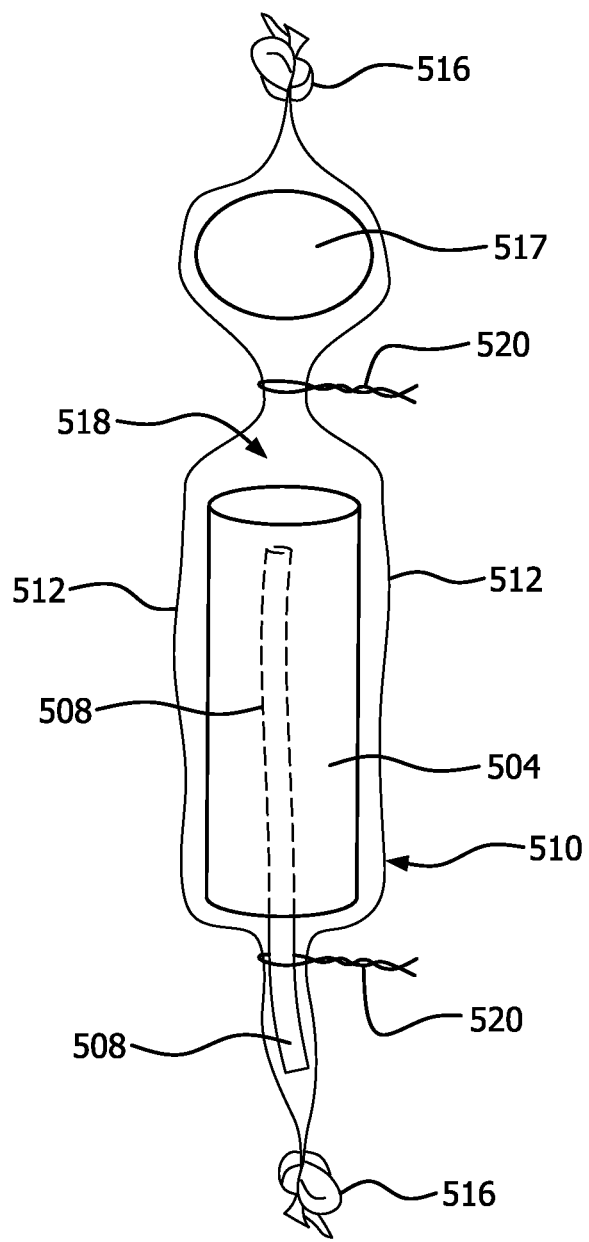
FIG. 22 a schematic side elevation, partially broken away and partially in phantom, of a single segment of a PCM capsule with an additional air capsule.

FIG. 19 is a plan view of a segmented PCM capsule assembly 500. The assembly 500 is comprised of a plurality of individual PCM portions 504. The PCM portions 504 are positioned on a conductor 508 made from a second heat-conducting material. The conductor 508 is wrapped in an outer shell 512 made from a first heat conducting material. The outer shell can be secured around each PCM portion by restrictors such as twist ties 520. The outer shell can be secured by tying knots 516 or other suitable means. A plurality of PCM capsules segments 510 a-e is thereby created. More or fewer segments are possible, as shown by the single segment 510 in FIG. 20. In FIG. 21, there is shown an embodiment wherein the conductor 508 comprises a stranded metal fin which is expanded into branches 509 inside the PCM portion 504 to improve heat transfer to the PCM portion 504. In FIG. 22, there is shown an air or other gas capsule 517 which can be provided to increase the overall density change, and to keep the capsule segment 510 upright in the tank. The capsule 517 can be positioned and secured within the outer shell 512 by a twist tie 520 or heat sealing of the outer shell 512.

Figure 23:
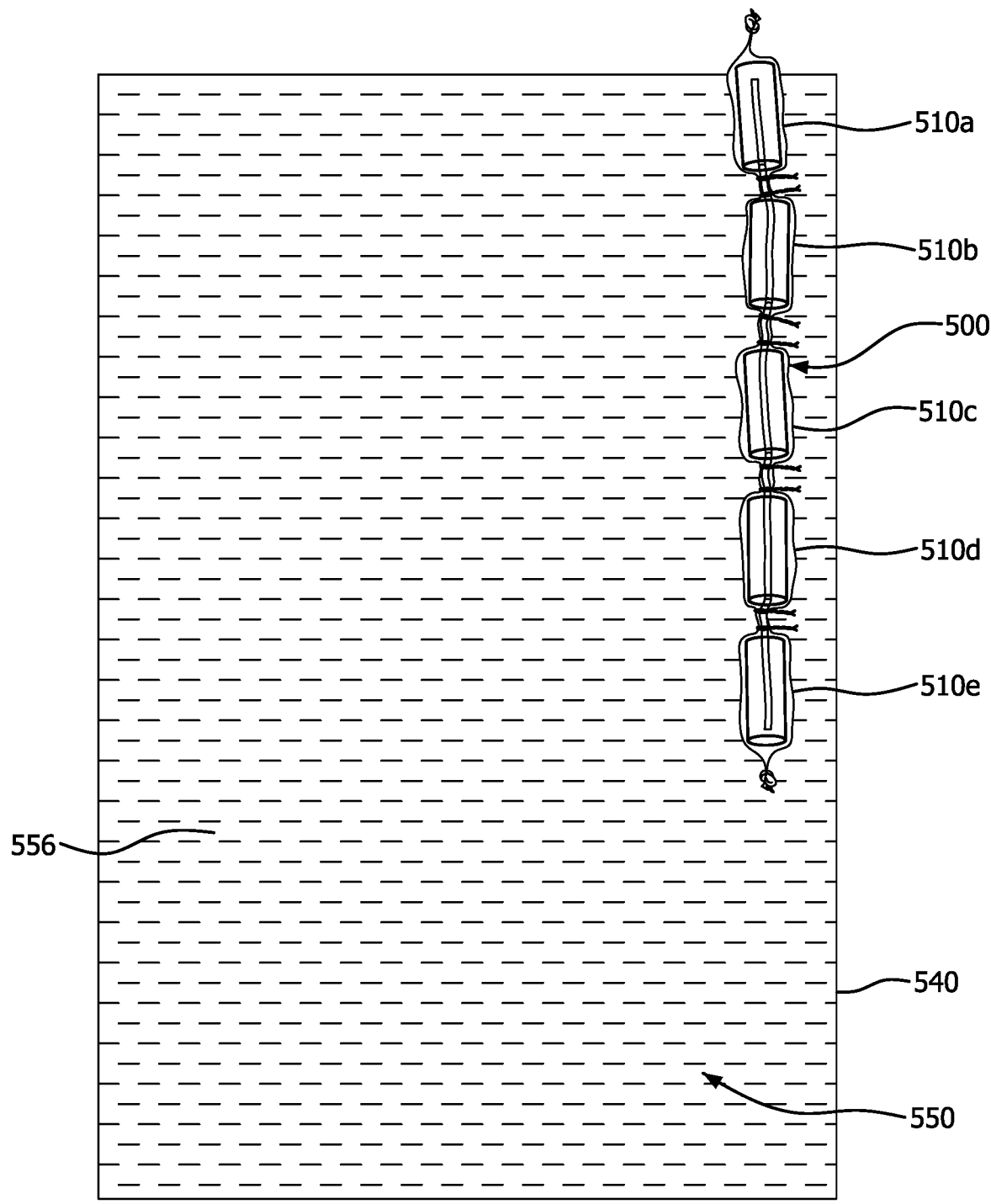
FIG. 23 is a schematic side elevation of a water tank with the segmented PCM assembly of FIG. 19, in a first mode of operation.
Figure 24:
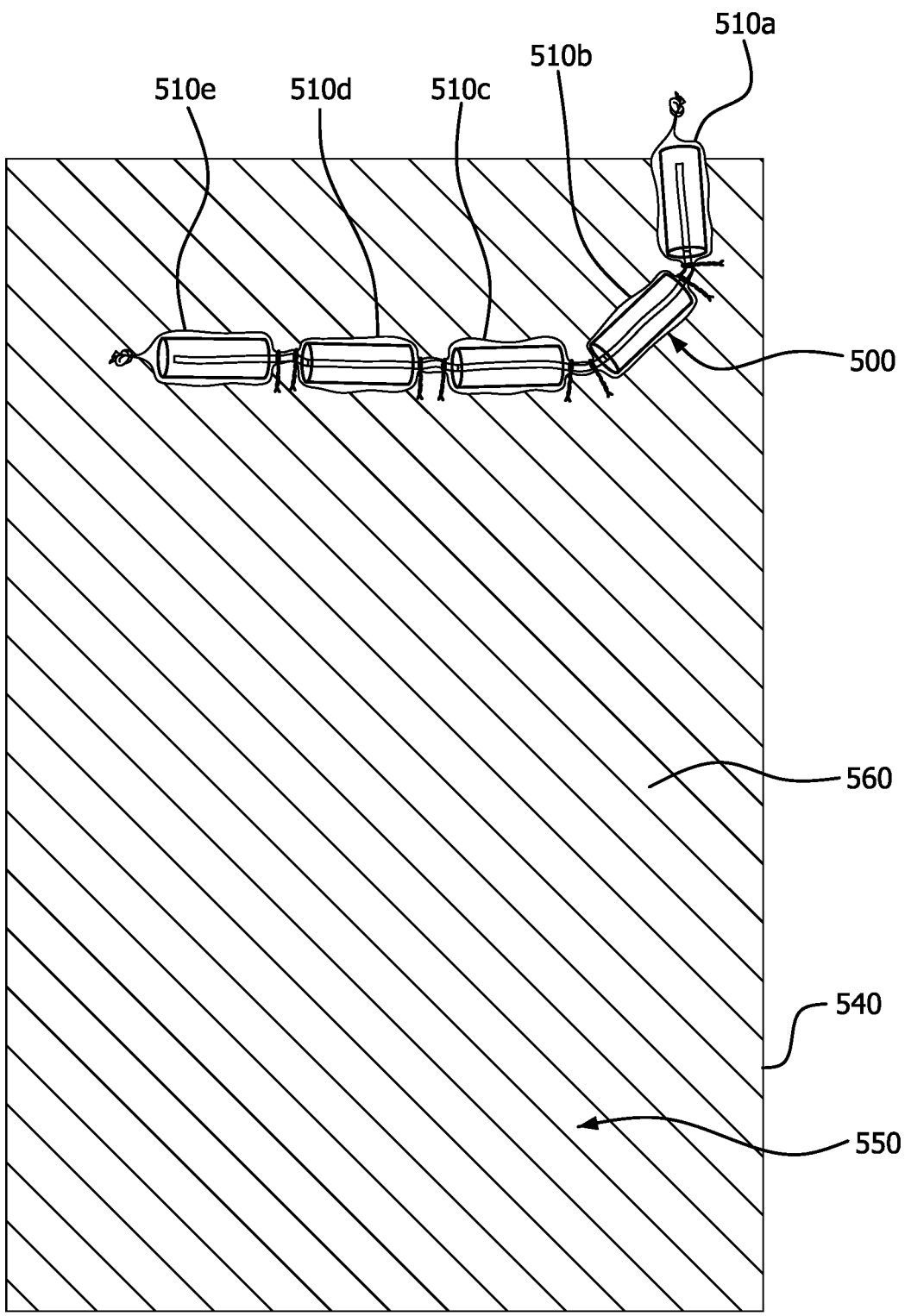
FIG. 24 is a schematic side elevation of a water tank with the segmented PCM assembly of FIG. 19, in a second mode of operation.

In practice, as shown in FIG. 23 the assembly 500 is positioned and secured in tank 540 at the end 510a. The tank 540 has an open interior 550 filled by water at a first temperature 556. As the water is heated and the temperature increases to a second temperature 560, as shown in FIG. 24, the PCM capsules 510a-e change phase and expand, reducing their density, and float within the tank while remaining secured at the top of the tank.

PCM capsules with various lengths of metal coil were fabricated by methods which insured low air infiltration into the PCM capsules, although in some embodiments, air inside an internal capsule 517 can be added to increase the span of density change of the capsule as seen in FIG. 22. The internal capsule 517 and PCM 504 can be separated by suitable structure such as twist tie 520 or heat sealed by melting the plastic. These PCM capsules without air addition were placed inside a 6-gallon tank at the outlet of a wrapped heat pump water heater with a stratified hot water tank. Each PCM capsule had an external fin for heat transfer and buoyancy control. Such a free-floating configuration allows for heat transfer to be local in the stratified hot water tank and only heat the water needed for delivery. The free-floating configuration allows for shocking of subcooled PCM into the solid state by movement in the tank. The coil inside the sphere increases the surface area for heat transfer inside the sphere. The external fin increases the external heat transfer on the outside of the sphere to the sphere.

The capsules were filled with food-grade PCM. The heat transfer in the PCMs was increased by using metals with more than 1000 times the thermal conductivity of the PCM. The type of metal wire was either copper or aluminum and the length of the wire was optimized to create neutral buoyancy. Capsules with the longer copper wire sunk or were neutrally buoyant at the desired temperature.

The coefficient of performance (COP) of a PCM stand-alone energy configuration saw a 6-14% increase in COP. Food grade PCMs doped with inert high conductivity materials was shown to be a successful solution for thermal storage inclusion with hot-water tanks.

Three first hour rating (FHR) tests were conducted with the PCM tank with an average tank temperature of 130, 125 and a baseline FHR without the tank in consideration. The results are listed in table 1.

TABLE 1

Food-grade PCM with 120° F. melt point and FHR rating. The FHR was calculated per the Code of Federal Regulations, Title 10 Chapter II, Subchapter D, Part 430, herein incorporated by reference. It should be noted the inlet temperature was 15° F. higher than a typical FHR in the baseline and prototype tests.

| Food-grade PCM 120° F. | Setpoint Temperature (° F.) | FHR* | Percent Improvement |
|---|---|---|---|
| Baseline | 125 | 61.3 | NA |
| Alpha Prototype (3.4 kg PCM) | 125 | 70.6 | 15.2 |
| Alpha Prototype (3.4 kg PCM) | 130 | 64.9 | 5.87 |

*The average inlet temperature was 15° F. higher than a typical FHR.

During the first draw of the FHR the average outlet temperature from the tank with PCM capsule inside have a 1.6° F. average temperature for the 38 gallons of water drawn. This is approximately 535 kJ of energy, assuming a 150 kJ/kg heat of fusion the energy gain from the PCM was 370 kJ, suggesting a 72.4% utilization factor of the heat. The ideal case is when the PCM spheres are neutrally buoyant enough below the delivery temperature to allow for heat transfer from the solidifying PCM into the water. These initial experimental results can be used to inform a 3D finite element CFD model of the 6-gallon tank where the water temperature of neutral buoyancy can be optimized.

Table 2 shows that, in total, 942 PCM 2 cm PCM spherical capsules were created with various metal coils inserted into the sphere. The lengths of the metal were varied from 6 cm to 21 cm in length. The weight of an 8 cm aluminum wire was approximately 0.3 grams. The plastic sphere dry weight was 0.5 grams.

TABLE 2

Sphere type and mass of components that were placed into the 6-gallon tank.

| Sphere Type | Grams of metal for length | Number of spheres | Mass of constructed sphere (g) | Mass of PCM (g) | Notes |
|---|---|---|---|---|---|
| 8 cm copper wire | 0.51479 | 81 | 4.8 | 347.1 | Sinks in 46.1° C. |
| 6 cm copper wire | 0.89394 | 30 | 4.2 | 99.21 | Floats in 46.1° C. |
| 8 cm aluminum wire | 0.27022 | 795 | 3.4 | 2487 | Floats in 46.1° C. |
| 21 cm aluminum wire | 0.62058 | 42 | 4.2 | 150.3 | Floats in 46.1° C. |

The total mass of the spheres with wires put into the 6-gallon hot-water tank was 3.403±0.0002 kg as weighed on a high accuracy scale. Random samples of the components were also weighed and the total PCM mass by calculation from the samples 3.084 kg with 0.309 kg of metal and plastic. This suggests a very small amount of the spheres had air in them, e.g., <0.3% by mass.

To achieve this high PCM mass fraction the PCM was entrained into the spheres by pulling a vacuum when the PCM was in the liquid state. The nominal PCM melt temperature reported by the manufacture is 48.9±2.5° C. The measurement was taken 3 times for solidification, as shown in Table 3.

TABLE 3

Measured solidification temperatures and melting temperature.

| Food-grade PCM 120° F. | Temperature of solidification (° F.) | Temperature of melting (° F.) |
|---|---|---|
| Sample 1 | 117.117 | About 115 |
| Sample 2 | 117.852 | — |
| Sample 3 | 119.070 | — |

The invention as shown in the drawings and described in detail herein disclose arrangements of elements of particular construction and configuration for illustrating preferred embodiments of structure and method of operation of the present invention. It is to be understood however, that elements of different construction and configuration and other arrangements thereof, other than those illustrated and described may be employed in accordance with the spirit of the invention, and such changes, alternations and modifications as would occur to those skilled in the art are considered to be within the scope of this invention as broadly defined in the appended claims. In addition, it is to be understood that the phraseology and terminology employed herein are for the purpose of description and should not be regarded as limiting.

We claim:
1. A medium comprising:
 a plurality of capsules, each capsule of the plurality of capsules comprising
  a phase changing material (PCM) configured to undergo a liquid-solid phase transition at a solidification temperature, $T_S$, wherein the PCM undergoes a relative volume change due to the phase transition, a shell filled with the PCM, wherein the shell comprises a first heat-conducting material, and wherein the shell is configured to comply to the relative volume change, and wherein the relative volume change is configured to cause a buoyancy force, which acts on each capsule of the plurality of capsules when the capsule is disposed in water at a water temperature, $T_W$, to be larger than the capsule's weight for $T_w > T_s$, and equal to or smaller than the capsule's weight for $T_w < T_s$;

further comprising a second heat-conducting material with higher heat conductance than the first heat-conducting material, wherein a portion of the second heat-conducting material is disposed inside the shell and in thermal contact with the PCM, and another portion of the second heat-conducting material protrudes outside the shell.

2. The medium of claim 1, wherein the shell encapsulates a fraction of air less than 1-3% by volume.

3. The medium of claim 1, wherein the shell is shaped as one of a spherical shell or a tubular shell.

4. The medium of claim 1, wherein the first heat-conducting material of the shell comprises plastic material configured to conduct heat.

5. The medium of claim 1, wherein the PCM comprises one of an organic PCM or a food-grade PCM.

6. The medium of claim 1, wherein $T_s$ is within ±5° F. of a design water temperature $T_o$ at the outlet of a water tank.

7. The medium claim 6, wherein each capsule of the plurality of capsules is neutrally buoyant in water at $T_o$.

8. The medium of claim 1, further comprising a gas capsule attached to the shell.

9. A system for heating water, the system comprising:
one or more tanks, each of the tanks configured to hold water;
an inlet coupled with one of the tanks to receive water at an input water temperature $T_{wi}$;
means for changing the temperature of at least a portion of the received water to a target water temperature $T_{wt}$;
an outlet coupled with one of the tanks to output the water at an outlet water temperature $T_{wo}$; and
a plurality of capsules, each capsule comprising
a phase changing material (PCM) configured to undergo a liquid-solid phase transition at a solidification temperature, $T_s$, wherein the PCM undergoes a relative volume change due to the phase transition,
a shell filled with the PCM, wherein the shell comprises a first heat-conducting material, and wherein the shell is configured to comply to the relative volume change; and
wherein the relative volume change is configured to cause a buoyancy force, which acts on the capsule when the capsule is disposed in water at a water temperature, $T_w$, to be larger than the capsule's weight for $T_w > T_s$, and equal to or smaller than the capsule's weight for $T_w < T_s$;
the capsules being immersed in the water held by the tank coupled with the outlet,
wherein, when heating the water in the tank causes the temperature inside the capsules to rise to or above $T_S$, the PCM undergoes a solid-to-liquid phase transition to create a charged capsule, and
the charged capsules are configured to float above the level of the outlet, and store latent heat captured during the PCM's solid-to-liquid phase transition, and wherein when cooling the water in the tank causes the temperature inside the capsules to drop to or below $T_S$,
the PCM undergoes a liquid-to-solid phase transition to create a discharged capsule, and
the discharged capsules are configured to float adjacent to the level of the outlet, and release the stored latent heat.

10. The system of claim 9, comprising a thermally stratified tank coupled with the inlet and with the outlet, wherein the capsules are immersed in the thermally stratified tank.

11. The system of claim 10, wherein the temperature of water at the outlet of the thermally stratified tank is $T_{wo}$, and the capsule is configured to be neutrally buoyant at $T_{wo}$.

12. The system of claim 11, wherein each capsule of the plurality of capsules is configured to be neutrally buoyant in water within a range of ±5° F. of $T_{wo}$.

13. The system of claim 9, wherein $T_s$ is from 115° F. to 155° F., and $T_{wo}$ is 110° F. to 160° F.

14. A method of heating water, comprising the steps of:
providing a tank for the water, the tank having an upper portion and a lower portion, and a water outlet and a water inlet, the water outlet being positioned between the upper portion and the lower portion;
providing in the tank a plurality of capsules, each capsule comprising:
a phase changing material (PCM) configured to undergo a liquid-solid phase transition at a solidification temperature, $T_S$, wherein the PCM undergoes a relative volume change due to the phase transition,
a shell filled with the PCM, wherein the shell comprises a first heat-conducting material, and wherein the shell is configured to comply to the relative volume change, and
wherein the relative volume change is configured to cause a buoyancy force, which acts on the capsule when the capsule is disposed in water at a water temperature, $T_w$, to be larger than the capsule's weight for $T_w > T_s$ and equal to or smaller than the capsule's weight for $T_w < T_s$; and,
heating the water in the tank to a target water temperature $T_{wt}$;
withdrawing water from the water outlet while inputting water through the water inlet, the withdrawn water having a temperature $T_{wo}$ that is higher than the temperature $T_{wi}$ of the inputted water and lower than $T_{wt}$, creating a stratified water temperature tank with a graduated water temperature decreasing from the upper portion to the lower portion;
wherein the PCM in the capsule will solidify and the capsules will sink in the stratified tank.

15. The method of claim 14, wherein the capsules are neutrally buoyant at a water temperature±5° F. of $T_{wo}$.

16. The method of claim 14, wherein the capsules further comprise a second heat-conducting material with higher heat conductance than the first heat-conducting material, wherein a portion of the second heat-conducting material is disposed inside the shell and in thermal contact with the PCM, and another portion of the second heat-conducting material protrudes outside the shell.

17. The system of claim 9, wherein the capsules are neutrally buoyant at a water temperature±5° F. of $T_{wo}$.

* * * * *